US005892820A

United States Patent [19]
Armstrong et al.

[11] Patent Number: 5,892,820
[45] Date of Patent: Apr. 6, 1999

[54] DIRECTORY ASSISTANCE ACCESS TO INTERCEPT TELEPHONE NUMBERS

[75] Inventors: Michael G. Armstrong, Philadelphia, Pa.; Jon G. Bastress, Crowsville, Md.; Miles S. Bowman, Broomall, Pa.; David Carlucci, Randolph, N.J.

[73] Assignee: Bell Atlantic Network Services, Inc., Arlington, Va.

[21] Appl. No.: 703,164

[22] Filed: Aug. 28, 1996

[51] Int. Cl.⁶ .................................................. H04M 3/44
[52] U.S. Cl. ........................... 379/213; 379/67.1; 379/70
[58] Field of Search .................................. 379/67, 88, 89, 379/201, 210, 211, 212, 213, 214, 207, 217, 67.1, 70, 79, 88.16, 88.17, 88.22, 88.25

[56] References Cited

U.S. PATENT DOCUMENTS

| | | | |
|---|---|---|---|
| 4,446,337 | 5/1984 | Cofer | 379/207 |
| 4,791,666 | 12/1988 | Cobb et al. | 379/213 |
| 4,918,719 | 4/1990 | Daudelin | 379/67 |
| 4,922,519 | 5/1990 | Daudelin | 379/67 |
| 4,959,855 | 9/1990 | Daudelin | 379/213 |
| 4,979,206 | 12/1990 | Padden et al. | 379/67 |
| 5,181,237 | 1/1993 | Dowden et al. | 379/88 |
| 5,259,026 | 11/1993 | Johnson | 379/207 |
| 5,339,352 | 8/1994 | Armstrong et al. | 379/58 |
| 5,450,476 | 9/1995 | D'Apuzzo et al. | 379/213 X |
| 5,479,488 | 12/1995 | Lennig et al. | 379/67 |
| 5,483,586 | 1/1996 | Sussman | 379/201 |
| 5,553,119 | 9/1996 | McAllister et al. | 379/67 |
| 5,613,006 | 3/1997 | Reese | 379/67 |
| 5,636,267 | 6/1997 | Utsumi et al. | 379/67 |
| 5,644,625 | 7/1997 | Solot | 379/88 |

*Primary Examiner*—Scott L. Weaver
*Attorney, Agent, or Firm*—McDermott, Will & Emery

[57] ABSTRACT

Directory assistance calls are routed to an operator tandem switch that distributes incoming directory assistance calls among available operator positions. For each call, the operator interacts with the caller to identify a directory listing sought by the caller and enters the listing information into the operator's terminal to retrieve the requisite information from a data base. An interface is provided between the directory assistance system and an intercept system to handle listings for which a directory number is no longer operative. A flag set in the data base file for the old directory listing would indicate that the number was on intercept. The system can thus provide current information contained in the directory assistance data base or updated information as to the status of subscriber's of non-working directory numbers, obtained from the intercept system data base.

23 Claims, 3 Drawing Sheets

DIRECTORY ASSISTANCE ACCESS TO INTERCEPT TELEPHONE NUMBERS

TECHNICAL FIELD

The present invention relates to telecommunications networks and more particularly to providing Directory Assistance access to information concerning telephone numbers that have been placed in an Intercept status.

BACKGROUND ART

Conventionally, the public switched telephone network (PSTN) system will place a telephone number on an 'Intercept' status if the number has changed or if the line has been disconnected. Calls placed to numbers on intercept, which therefore cannot be completed as dialed, are routed instead to an intercept system. Such system may provide a message to the caller with an appropriate announcement, determination of which may be made by accessing an intercept data base. For example, if the database indicates a change of the telephone number, the announcement can inform the caller of the new or 'referral' number. If instead the called line has been disconnected without change of number, the message can notify the caller of the inactive status.

Known intercept systems are disclosed, for example, in U.S. Pat. No. 4,446,337 to Cofer and U.S. Pat. No. 4,791,666 to Cobb et al. The Cofer system delivers intercept messages that originate from the caller's originating switching office rather than at the destination office or an intermediate switching location. A message intercept condition can occur at the destination office or other location remote from the originating office. Such condition is signaled to the originating office and used to actuate a suitable announcement message apparatus. The originating office is equipped to forward an acknowledgement signal to the terminating office so that the trunk circuit can be released. The Cobb et al. system interfaces an electromechanical (EM) switching office having step-by-step or crossbar switching equipment with a remotely located digital changed number intercept system such as that disclosed by Cofer.

Directory assistance is a commonly provided service of the PSTN for a caller who does not know the directory number of the intended called party and does not have the appropriate "white pages" directory readily available. In response to a call placed to directory assistance, identifying the intended called party and address, a directory assistance data base equivalent to the white pages directory is accessed to obtain the directory number of the intended called party. If a change has occurred in the subscriber's status, such as termination of service or change in directory number or address, potential problems arise in providing accurate information. The data base may not have been updated with new material. Even if updated, the caller may not be aware of a new address that would be necessary to access the data base.

There is no standard interface between directory assistance and the conventional automatic intercept system. If the intercept number is contained in the directory assistance data base before updating has occurred, the caller upon obtaining the number, must place a new call to the intercept number to be provided with the appropriate intercept message. An additional call to the changed number, if such circumstances exist, may then be necessary to complete a call to the intended party. A more likely occurrence is that directory assistance has no information in its data base as to dropped telephone numbers and considerable time must be spent by a live operator to determine, often without success, the subscriber status of the intended called party and whether a new directory number is active for that party. A similar drawback exists in situations in which the directory assistance data base contains a new listing for a subscriber who has moved to a new address. If the caller is not aware of the change of address, input to directory assistance of the old address will present difficulty in finding the intended called party's directory number. If the subscriber name is a common name associated with several listings at different addresses, or the subscriber name is a business having several directory listings, obtaining accurate information is further complicated.

Examples of directory assistance systems are described in the following patents. U.S. Pat. No. 4,979,206 to Padden et al. and U.S. Pat. No. 4,959,855 to Daudelin disclose an automated directory assistance system using speech recognition and speech synthesis technology. The caller is given the option to complete a call to the station identified by a retrieved directory listing. U.S. Pat. No. 5,181,237 to Dowden et al. discloses a system for automatically processing operator assistance type calls, without actually connecting the calls to a live operator. The system includes an automated position group, having speech recognition facilities and announcement capabilities, to replace the functions of a human operator. U.S. Pat. No. 4,922,519 to Daudelin discloses an automated operator assistance calling system. An operator assistance switch initially connects the calling customer to a voice processing unit and prompts the customer to speak a command or key a command code identifying the desired class of call, for example a person-to-person call. The command/code is recognized and used to direct the flow of the control program to selectively defer a connection to an operator position. U.S. Pat. No. 4,918,719 to Daudelin discloses an automated announcement system for processing directory assistance and/or intercept calls. The disclosed system permits connection to an operator after completion of the announcement, for example in response to speech from the caller.

U.S. Pat. No. 5,339,352 to Armstrong et al. discloses a directory assistance system in which a call may be completed, upon request, by the system to the station identified by the retrieved listing. This feature is particularly useful if the caller is using a wireless communication device.

None of these prior art systems enables a call dialed to directory assistance to be automatically referred to an intercept handling system. Thus, at present, a caller who refers to personal records or an old telephone book to identify an out-of-date directory number will be connected to the intercept system by dialing the old number; if that person instead calls directory assistance, either the correct information will be reached through great effort by the directory assistance operator or no information will be obtainable. In either case, an unacceptably long delay in the directory assistance call would occur. Such delays are annoying to callers and extremely costly to the telephone company.

DISCLOSURE OF THE INVENTION

The present invention overcomes the above noted drawbacks of conventional systems and provides additional advantages in part by routing all directory assistance calls to an operator tandem switch. A group of multipurpose operator position terminals connect to that switch. The switch distributes incoming directory assistance calls among the available operator positions. For each call, the operator interacts with the caller to identify a directory listing sought by the caller and enters the listing information into the operator's terminal to retrieve the requisite information from a data base. The operator then transfers the call and the retrieved information to an audio announcement module that produces digitized speech representing the retrieved listing information to the caller. An interface is provided between the directory assistance system and the intercept system. A flag set in the data base file for the old directory listing would indicate that the number was on intercept. When the operator transfers the call to the audio subsystem for the announcement, that subsystem would query the intercept data base for the intercept announcement information. The directory assistance caller would then be given the intercept announcement, e.g. with a referral number, without initiating a second call.

Additional advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
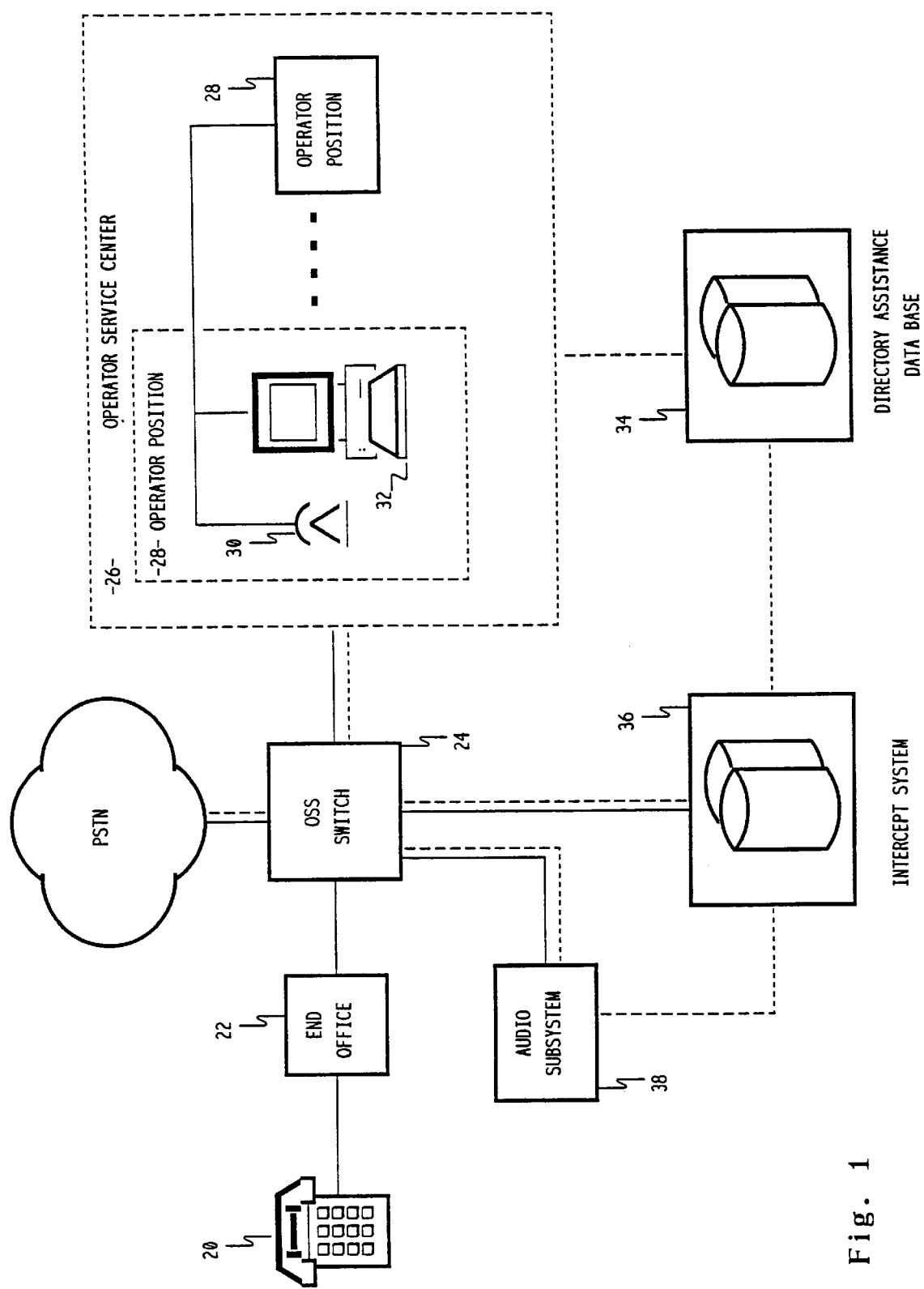
FIG. 1 is a block diagram of the directory assistance intercept system in accordance with the present invention.

FIG. 1 is a block diagram that illustrates the directory assistance system and the manner in which it interfaces with the intercept system in accordance with the present invention. Subscriber station 20, shown as a telephone in the drawing, is shown coupled by a subscriber line connection to end office 22. These elements are typical of the well known public switched telephone network (PSTN) that includes a vast plurality of subscriber stations and switching offices of various kinds, linked in a network by lines and trunks. Transmission paths may be voice paths, shown in the drawing by solid line connectors, or data paths, shown by dashed lines. The PSTN is shown merely generally, elements thereof that are not necessary for explanation of the present invention being deleted for simplicity of illustration. For purposes of exemplification of the invention, it is assumed that subscriber station 20 is calling for directory assistance.

For processing directory assistance calls, the end office 22 connects via a dedicated trunk to the switch of an operator service system 24 (OSS). For processing Directory Assistance calls, the end office 22 connects via a dedicated trunk to the switch of an operator services system 24 (OSS). The current interoffice signalling scheme employs Multifrequency Signalling although migration to Signaling System 7 will likely become the preferred future arrangement. Although the OSS system 24 is capable of providing other operator services, for purposes of the present invention the system 24 functions as a directory assistance service system including a switch for routing calls to operator service center 26. In the simplified illustration of FIG. 1, the operator service center includes a number of operator positions 28. Each operator position is essentially a workstation having a telephone 30 and processor terminal 32. A local area network interconnects the plurality of operator positions. Each operator position has access to one or more directory listing data bases 34 via the local area network or other data connection path. The OSS switch 24 can also connect to other switching offices of the public switched telephone network to offer directory assistance services, including call completion, to network subscribers.

The OSS switch is a programmed control type telephone switch that is set up specifically to provide a variety of operator services. In the preferred embodiments, the OSS switch is a DMS-200 Telephone Operator Position Switch (TOPS) manufactured by Northern Telecom or Operator Services Position System (OSPS) switch which is a 5ESS type switch manufactured by AT&T, or equivalents thereof. The OSS switch provides call distribution to the operator positions. The switch provides switched two-way voice communications between the operator positions 28 and voice circuits of any trunks or lines on which calls are received. OSS switch 24 is also connected, via voice and data links, to intercept system 36. The OSS switch has the capability for routing calls to terminals serving other operator functions, such as "0+" operator assistance call processing (e.g., for collect calls).

Two-way data communication between the operator positions 28 and the directory assistance data base 34 is provided, as illustrated by a data line connection, by a local area network (LAN) to allow operators to input selection data and quickly receive the selected listing data retrieved from the information stored in the data base. Alternatively, connection can be made between the operator station and the data base by the OSS switch 24. The OSS switch also connects to an audio subsystem 38 via both voice path and data path. The audio subsystem may be as described in U.S. Pat. No. 5,339,352, wholly incorporated herein by reference. Directory assistance data base 34 includes subscriber listings similar to a standard white pages directory. Generally, each listing includes a subscriber name, not necessarily the full name, at least a partial street address, and the subscriber's directory number.

The audio subsystem replays standardized prompt messages and digitized speech announcements of retrieved directory listing information for transmission through the switch to callers requesting directory assistance and call completion services. The OSS switch 24 also provides switched connections of calls received on the incoming directory assistance trunks to trunks and/or lines of the public switched telephone network. These outgoing connections allow the switch 24 to provide complete call connections to destination stations identified by retrieved directory listing information.

Intercept system 36 contains a data base of listings for directory numbers that have been discontinued, either for termination of service or for change of directory number. Directory numbers may be changed for any of a variety of reasons. A residential subscriber may have moved or needed upgraded services which were not available with the old number. Business subscribers may rearrange departments or install different communication systems in various areas. The previous number may be replaced by a "referral" number that is associated with customized treatment.

The intercept system provides its traditional function for calls placed to non-working numbers. As such calls can not be completed as dialed, the term "dialed" being applicable to both rotary and touch tone stations, the respective end offices route the calls to the intercept system. In the embodiment of the present invention, the call is routed through the OSS switch. A message received through the data path identifies the called, non-working number. This number is used to access a record in the intercept data base to obtain the subscriber status. An appropriate announcement is transmitted to the caller. Standard intercept announcements may state that the called number is no longer listed, identify the new number that has replaced the called number, or provide a non-published status. The announcement may originate in the intercept system and be transmitted through the voice path connected to the OSS switch. Alternatively, the message may originate in and be transmitted from the audio subsystem 38. In the latter case, pertinent information accessed from the intercept system data base is conveyed over the data path to the audio subsystem.

In the present invention, the directory assistance operator service center and the intercept system are interfaced to enable more efficient dissemination of information to callers seeking directory assistance. The directory assistance data base in the present invention differs from the conventional directory assistance data base in part in the treatment of changed listings. Conventionally, a directory number that is no longer working, either because subscriber service has been terminated or because the number has been replaced, remains listed in the data base only until deleted or replaced by the new listing, which would normally occur within one day of service order completion. Before updating occurs, callers seeking the directory number are given the outdated number. Current information in the conventional arrangement can be obtained only by placing another call to the outdated number to reach the intercept system. A call to directory assistance after updating occurs will result in no information from the directory assistance data base if the service has been discontinued. If the listing has been changed and the caller cannot adequately identify the subscriber, the new listing will not be accessed and again no information will be obtained from the directory assistance data base. It is not uncommon for several different listings to be associated with the same subscriber name such as, for example, a first initial with a common last name. If a caller does not know in sufficient detail the street address of the intended called party, the appropriate listing is difficult to identify as the operator is faced with apparently indistinguishable choices.

In the present invention, old listings of disconnected or changed numbers will be analyzed for suitability to be retained for an appreciable period after the directory assistance data base has been updated. During this time period the data base thus will include both the old and new listings. The old listing will be flagged or given an intercept indicator at the time that updating occurs. At such time the intercept data base will have added an entry for the change.

Directory assistance calls are established over voice paths via the OSS switch. If a caller identifies the name and address in the new listing, the listing can be quickly accessed in a normal fashion. The OSS switch can immediately bridge the call to the audio subsystem while transmitting the accessed data thereto over the data link. The operator position, now no longer connected to the call is free to handle a new call.

If the caller instead identifies the name and address in the old listing, that listing also can be quickly accessed. The OSS switch, recognizing the intercept indicator status, can immediately bridge the call to the intercept system or audio subsystem, again leaving the operator position free to handle another call. The operator is thus relieved of the burden of trying, with low likelihood of success, to determine the new status of the subscriber of an non-working number. Such information is contained in the intercept data base, which is readily accessed by receipt of the directory number in the old listing in a data transmission from the operator position. The information accessed from the intercept system can then be sent to the audio subsystem from which an appropriate announcement is made to the caller.

Transfer of the data inquiry to the intercept data base is preferable to reporting the old number to the caller as the need to place an additional call to the old number is then obviated. In addition to the advantage of efficient call handling, the caller is more likely to be satisfied with obtaining the desired information in a charged call than being given a non-working number in that call, which in turn must be called. The preferred time period for retention of old listings in most circumstances is four months, although different periods may become more desirable in the future.

Figure 2:
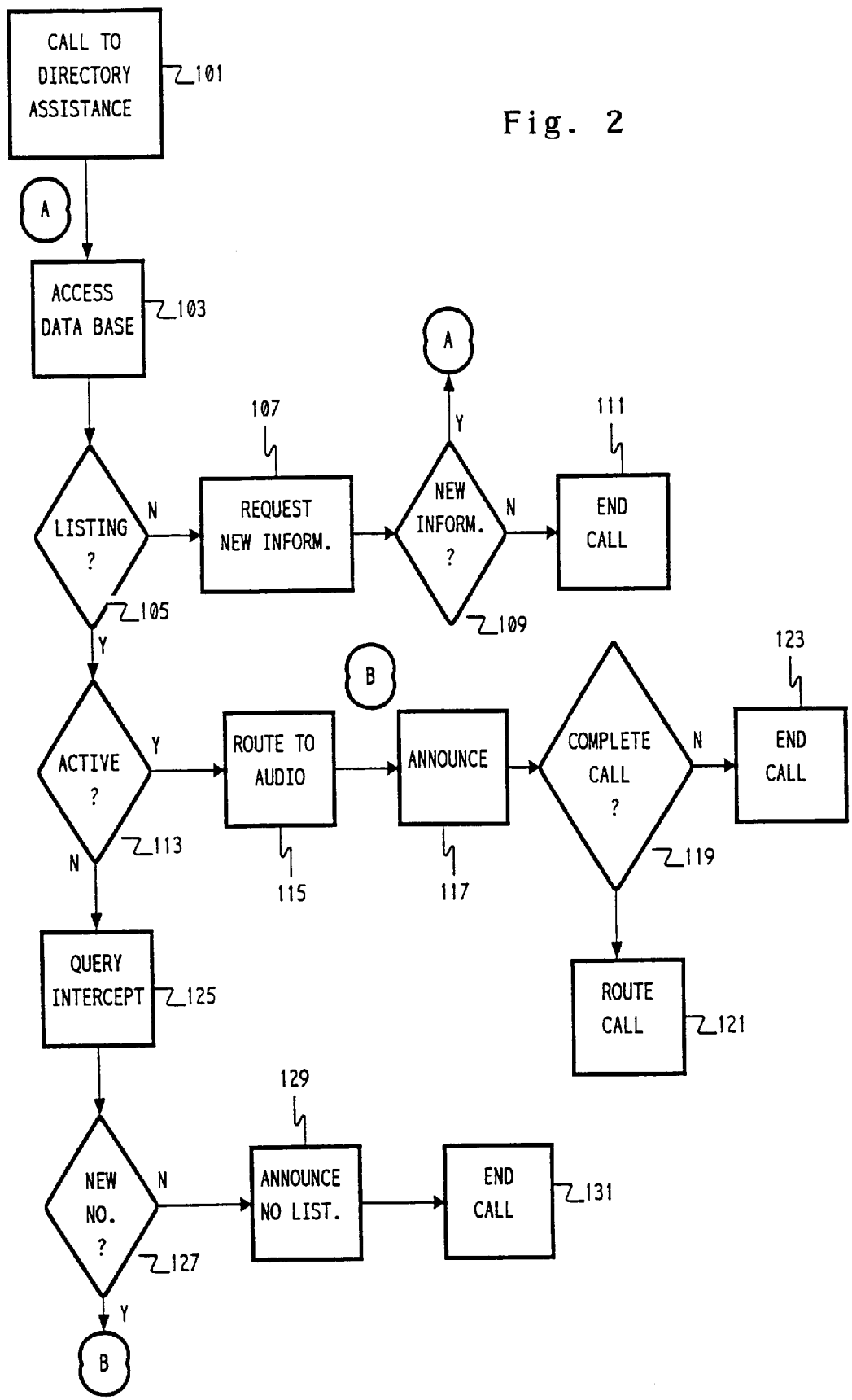
FIG. 2 is a flow chart illustrating the processing of a directory assistance call in accordance with a preferred embodiment of the present invention.

FIG. 2 is a flow chart illustrating the processing of a directory assistance call in accordance with a preferred embodiment of the present invention, as depicted in FIG. 1. At step 101 a call is initiated to directory assistance. A voice path is established between the caller and an operator position via the caller's end office and the OSS switch. The operator queries the caller for the intended called party, including location, name and address. Through terminal 32, the operator accesses the directory assistance data base at step 103, using the caller provided information to obtain a listing for the intended called party.

At step 105, a determination is made as to whether a listing has been obtained. If no listing was found for the information provided, the operator so informs the caller and may seek further information from the caller, such as confirming the spelling of the called party name and location at step 107. If it is determined at step 109 that different information is provided, the process reverts to step 103 to access again the directory assistance data base. If no further information is obtained from the caller, the call is terminated at step 111.

If a listing has been identified at step 105, such listing may be for a currently working number or for a number that is no longer active. In the latter case, the listing will contain an intercept indicator or flag. At step 113, a determination is made as to whether the listed number is active. If so, the call will be bridged to the audio subsystem 38 at step 115 and the voice path released from the operator position. At this time, directory listing information is transmitted over a data path to the audio subsystem. The audio subsystem announces to the caller the listed directory number and provides an option for completing the current call to the listed directory number destination. By entering the appropriate DTMF or voice response, the caller can request this option. If it is determined at step 119 that the caller has responded, then the call is routed to the listed directory number at step 121. If not, the call is terminated at step 123.

If it is determined at step 113 that the listed number is inactive, it is preferred that a query data message is sent to the intercept system at step 125, the call bridged to the audio subsystem and released from the operator position. Alternatively, the call may be bridged to the intercept system. The intercept system data base contains records for all directory numbers made inactive during a preselected time span. The records indicate either termination of service or change in directory number, which may or may not be published. In the latter case the new published directory number will be included in the record. A determination is made at step 127 of whether the inactive number has been replaced with a published number. If not, an announcement is made by the audio subsystem at step 129 that provides the caller with the latest status, e.g. the number is not listed, and the call is terminated at step 131. If a new published directory number is in effect, the process reverts to step 117, wherein an announcement including the new number and option for call completion can be given to the caller.

Figure 3:
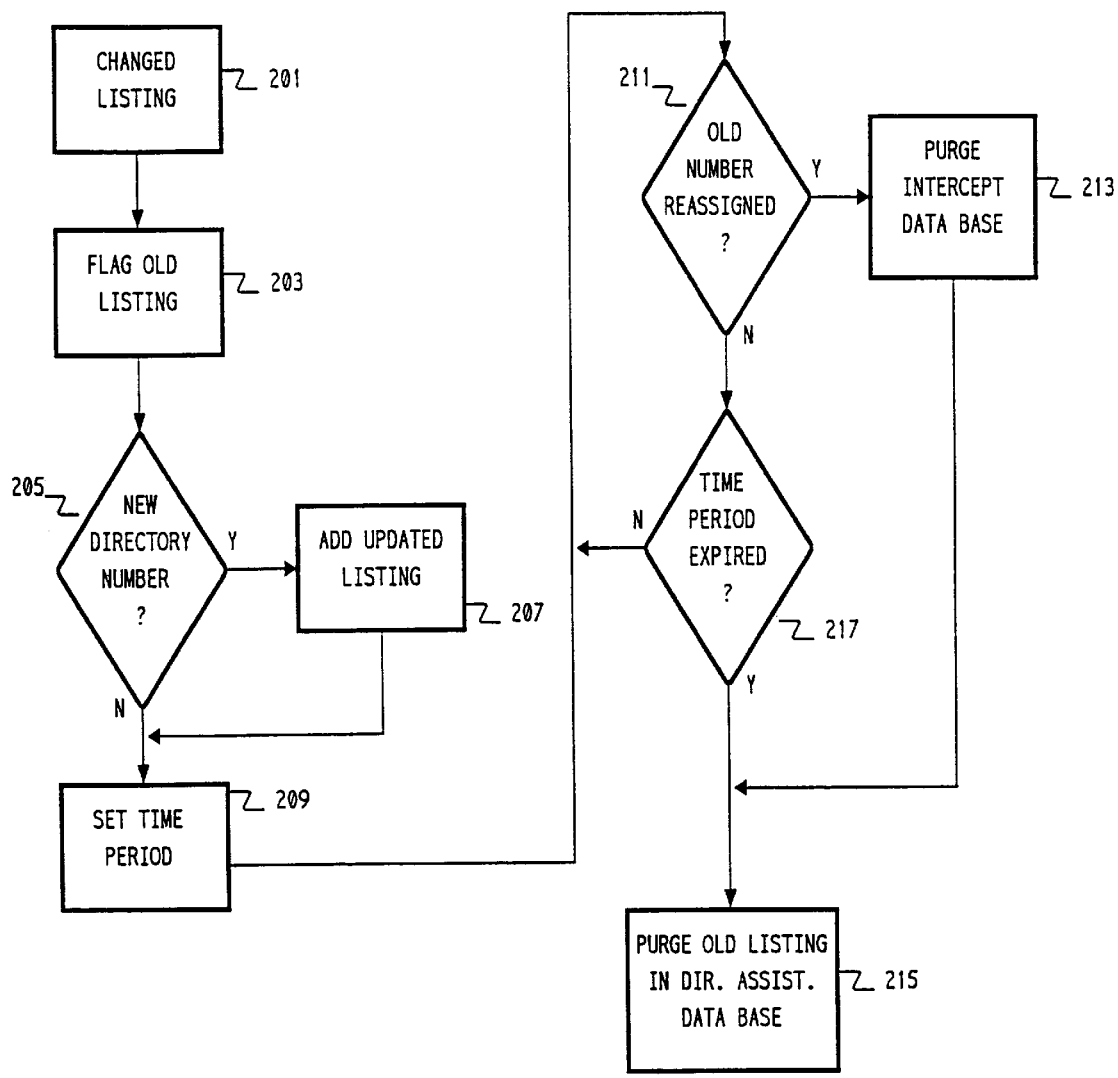
FIG. 3 is a flow chart illustrating processing of the directory assistance data base and intercept data base when a change is made to an existing telephone number listing in accordance with one embodiment of the present invention.

In summary, implementation of the directory assistance call processing according to the invention makes advantageous use of the intercept system for calls seeking information for telephone listings that have been changed. With the arrangement of the invention, the operation of the intercept system has been expanded beyond its conventional functionality of responding to calls placed to nonworking telephone numbers. The intercept system data base contains a list of previously active telephone numbers that have been changed to inactive status. When one of these numbers is reassigned to another subscriber it again becomes active. The number is then purged from the intercept system data base so that a call dialed to that number will be routed to the subscriber, not to the intercept system. If a directory assistance call is then received that is directed to the old, flagged listing of the previous subscriber to that telephone number, a query data message sent to the intercept system will illicit no positive response. The operator would then have to deal with the call with the information only that the listing is inactive. To avoid this situation, it is preferred that flagged listings be purged from the directory assistance data base when the inactive telephone numbers are reassigned. FIG. 3 is a flow chart illustrative of the effect on the directory assistance data base and the intercept data base following a change in status of a telephone directory number.

Step 201 represents a change in directory listing wherein a telephone number is given an inactive status. The listing in the directory assistance data base is retained and flagged with an intercept indicator at step 203. An entry for the telephone number is made in the intercept data base to provide updated information. A determination is made at step 205 of whether the subscriber has been assigned a new directory number. If so, an updated listing is added to the directory assistance data base at step 207. The old listing will be retained in the directory assistance for a maximum period as set at step 209.

As illustrated in FIG. 1, the directory assistance system is interfaced with the intercept system. Whenever an inactive number is reassigned to become active, the intercept data base is purged of the entry for that number. Step 211 is represented by a decision block that determines whether an inactive number, having a flagged listing in the directory assistance data base, has been reassigned. If so, the intercept data base entry is purged at step 213 and the directory assistance data base listing is purged at step 215. If not, both data base records remain intact until expiration of the respective maximum set time periods. These periods may be the same or different for each data base. The set time period for the intercept data base should be at least as long as the directory assistance data base so that there will be a corresponding intercept data base entry for any referenced flagged directory assistance data base listing. If there has been no reassignment of a flagged directory assistance data base listed telephone number, the length of time of the listing is monitored to determine if the set maximum period has expired, at step 217. If so, the listing is purged from the directory assistance data base at step 215. If the time period has not expired, the listing is retained and monitoring for reassignment of the number continues at step 211.

It can be appreciated that interfacing the directory assistance data base with the intercept system not only permits a quick dependable response to a directory assistance caller for a subscriber whose service has been terminated, but for instances in which the caller has identified the old address of a changed subscriber. Only the preferred embodiments of the invention and but a few examples of its versatility are shown and described in the present disclosure. It is to be understood that the invention is capable of use in various other combinations and environments and is capable of changes or modifications within the scope of the inventive concept as expressed herein.

We claim:

1. In a public switched telephone network serving a plurality of subscriber stations and including a directory assistance operator service center for providing listed directory numbers to callers and an intercept system for intercepting telephone calls dialed to non-working directory numbers, a method for processing a telephone call dialed to said directory assistance operator service center comprising:

connecting said telephone call to said directory assistance operator service center;

obtaining information from the caller comprising the name of an intended called party;

accessing a directory assistance data base for a listing related to the obtained information;

in response to data received in said accessing step that indicates a predetermined condition associated with said intended called party, transmitting a data message to said intercept system; and communicating to said caller.

2. A method as recited in claim 1, wherein said data base comprises directory number listings for PSTN subscribers, said listings relating subscriber names and telephone directory numbers; and wherein said predetermined condition comprises an inactive status of the directory number listing of said intended called party.

3. A method as recited in claim 2, wherein said data message comprises identification of the inactive directory number and further comprises bridging said intercept system to said call;

releasing said directory assistance operator service center from said call; and said step of communicating comprises transmitting an announcement from said intercept system to said caller.

4. A method as recited in claim 3, wherein said announcement relates information associated with a particular change in subscriber status, said particular change being determined in response to accessing an intercept system data base containing inactive number listings.

5. A method as recited in claim 4, wherein said particular change is disconnection of the subscriber station.

6. A method as recited in claim 4, wherein said particular change is a new directory number assignment and said announcement identifies said new directory number.

7. A method as recited in claim 2, wherein said data message comprises identification of the inactive directory number and further comprises bridging the call to an audio subsystem;

releasing said directory assistance operator service center from said call; and said step of communicating comprises transmitting an announcement from said audio subsystem to said caller.

8. A method as recited in claim 7, wherein said announcement relates information associated with a particular change in subscriber status, said particular change being determined in response to accessing an intercept system data base containing inactive number listings.

9. A method as recited in claim 8, wherein said particular change is disconnection of the subscriber station.

10. A method as recited in claim 8, wherein said particular change is a new directory number assignment and said announcement identifies said new directory number.

11. A method as recited in claim 10, further comprising completing the call to the new directory number destination in response to a request by the caller.

12. A method as recited in claim 11, wherein said request is implemented as DTMF input.

13. A method as recited in claim 11, wherein said request is implemented as voice input.

14. A method as recited in claim 10, wherein said directory assistance data base concurrently includes the directory listing for the intended called party's new directory number and a previous directory listing containing the intended called party's original directory number.

15. In a public switched telephone network serving a plurality of subscriber stations comprising:

a directory assistance operator service center for providing listed directory numbers to callers, said service center having a data base associated therewith containing subscriber directory number listings, each said directory number listing including subscriber name and directory number; and an intercept system for intercepting telephone calls dialed to non-working directory numbers;

a method for adapting said directory assistance operator service center to changes in status of subscribers that affect directory listings, comprising:

setting an indicator in the data base directory number listing for a subscriber having a changed status;

retaining the directory number listing having said indicator in the data base for a predetermined maximum period of time; and connecting a call, made to said directory assistance operator service center by a caller seeking the directory number for a listing for which an indicator has been set, to said intercept system.

16. A method as recited in claim 15, wherein said changed status is disconnection of a subscriber station and said method further comprises announcing to the caller that there is no listing for the intended called party.

17. A method as recited in claim 16, wherein said step of announcing comprises obtaining information from said intercept system.

18. A method as recited in claim 15, wherein said changed status includes change of address and directory number of a subscriber and further includes the step of entering a new directory listing without an indicator for the subscriber in the data base while retaining the old listing having said indicator.

19. A method as recited in claim 18, wherein said step of connecting comprises responding to identification by the caller of an address that matches the address in said old listing and further including the step of announcing to a caller the directory number in said new directory listing in response to the caller's identification of an address that matches the address entered in said new directory listing.

20. A method as recited in claim 15, wherein the changed status in said setting step is an inactive condition of the directory number of said listing, and further comprising:

detecting, prior to expiration of said maximum period of time, whether said directory number has been reassigned; and in response to detection of reassignment of said directory number, purging said retained directory number listing from said data base.

21. In a public switched telephone network serving a plurality of subscriber stations and including a directory assistance operator service center for providing listed directory telephone numbers to callers, said service center having a first data base associated therewith containing subscriber directory number listings, each said directory number listing including subscriber name and telephone number, an intercept system for intercepting telephone calls dialed to non-working directory numbers, said intercept system having a second data base associated therewith containing an index of inactive telephone numbers, and an audio subsystem for providing announcements to callers, a method comprising:

setting an indicator in the first data base listing for a subscriber having a changed status;

retaining the listing having said indicator in the first data base for a predetermined maximum period of time;

entering the telephone number for the changed status in said second data base; and in response to reassignment of the entered telephone number prior to expiration of said maximum period of time, deleting the retained listing from the first data base and purging the entered telephone number from the second data base.

22. A method as recited in claim 21, further comprising the step of accessing said second data base in response to a call placed to said directory assistance operator service center for information associated with a listing in said first data base that contains an indicator provided in said setting step.

23. A method as recited in claim 21, further comprising the step of routing a call placed to said directory assistance operator service center to said audio subsystem in response to a request from the caller for information associated with a listing in said first data base that contains an indicator provided in said setting step.

* * * * *